(12) United States Patent
Yamaguchi

(10) Patent No.: US 6,202,620 B1
(45) Date of Patent: Mar. 20, 2001

(54) LUBRICATING STRUCTURE FOR INTERNAL COMBUSTION ENGINE

(75) Inventor: Masashi Yamaguchi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/372,680

(22) Filed: Aug. 12, 1999

(30) Foreign Application Priority Data

Sep. 4, 1998 (JP) .................................................. 10-250987

(51) Int. Cl.$^7$ ........................................................ F16C 3/04
(52) U.S. Cl. ........................................................ 123/196 R
(58) Field of Search ........................ 123/196 R; 184/6.5; 74/605

(56) References Cited

U.S. PATENT DOCUMENTS 4,622,933 * 11/1986 Fukuo et al. ..................... 123/196 R
5,163,341 * 11/1992 Murrish et al. ................... 123/196 R
5,799,547 * 9/1998 Agarrat ................................... 74/605

FOREIGN PATENT DOCUMENTS 7-27126   1/1995 (JP) .

* cited by examiner

Primary Examiner—Noah P. Kamen
Assistant Examiner—Hyder Ali
(74) Attorney, Agent, or Firm—Foley & Lardner

(57) ABSTRACT

A lubricating structure for enhancing lubricating capability against a connecting-rod bearing part is provided for an internal combustion engine. In the structure, a crankshaft 15 is provided, for one crank journal 16 and one crank pin 17 adjoining the crank journal 16, with a first oil hole 18 and a second oil hole 19 in pairs. In view of the axial direction of the crankshaft 15, an opening 19a of the second oil hole 19, which opens onto the outer peripheral face of the crank journal 16, is arranged so as to substantially lie on a straight line C for connecting a center A of the crank pin 17 with a center B of the crank journal 16.

6 Claims, 6 Drawing Sheets

LUBRICANT FROM MAIN GALLEY

LUBRICATING STRUCTURE FOR INTERNAL COMBUSTION ENGINE

BACKGROUND OF THE INVENTION

1. Field of the Invention

The present invention relates to a lubricating structure for an internal combustion engine and more particularly, it relates to a lubricant passage structure formed in a crankshaft of the engine.

2. Description of the Related Art

Generally, lubricating oil in the internal combustion engine is sucked up from an oil pan through the intermediary of a strainer by an oil pump. Thereafter, the pressure of lubricating oil is controlled by a pressure governor and subsequently, the oil is fed to a main gallery. Formed to branch off from the main gallery are respective oil holes (or lubricant passages) through which the lubricating oil is supplied to respective lubricating sections, for example, a moving valve system, the crank shaft and so on.

As one of the oil hole structures provided in the crankshaft, there is known a general H-shaped lubricating structure where parallel oil holes (i.e. parallel lubricant passages) are respectively formed in both each crank journal and each crank pin so as to be perpendicular to a line connecting a center of the crank journal with a center of the crank pin in the axial view of the crankshaft. In this lubricating structure, an additional oil hole is formed so as to connect the oil hole of the crank journal with the oil hole of the crank pin at respective intermediate portions thereof (Japanese Unexamined Patent Publication No. 7-27126).

SUMMARY OF THE INVENTION

Further, there is also proposed an oblique oil hole structure which has the advantage of both simplicity in the configuration of oil holes and superior formability of the oil holes.

FIG. 1 is a schematic view for explanation of the above-mentioned oblique oil hole structure. In the figure, reference numeral 1 denotes a crankshaft. In the crankshaft 1, a first oil hole 4 is formed to extend from the outer peripheral face of a crank journal 2 to the outer peripheral face of a crank pin 3 while penetrating both crank journal 2 and crank pin 3. Furthermore, the crankshaft 1 is provided with a second oil hole 5 which has one end communicating with a part of the first oil hole 4 positioned in the crank journal 2 and the other end opening onto the outer face of the crank journal 2.

Now, if the opening of the oil hole in the crank journal is positioned at an area of thin oil-film thickness (e.g. less than approx. 2 $\mu$m) resulting from the approaching of the outer peripheral face of the crank journal to the inner face of a main metal for bearing the journal, there will be caused a condition equivalent to a case where the width of the main metal is reduced by the opening of the oil hole. Consequently, it may cause the oil-film pressure to be elevated radically and the minimum oil-film thickness to be decreased.

Taking such an apprehensive situation into consideration, it has been proposed, as a general design technique against the crankshaft 1 employing the above-mentioned oblique oil hole structure, to allow the arrangement of the second oil hole 5 in the crank journal 2 to resemble that of the general H-shaped oil hole structure in a manner that the frequency where the oil hole in the crank journal 2 opens at the area of thin oil-film thickness is substantially equal to that of the general H-shaped oil hole structure thereby to maintain the wear-resistant and seizure resistant capacities affecting the reliability of the main metal.

In detail, assuming that, under condition of the crank pin 3 of a straight 4-cylinder engine occupying upward in the vertical direction, the vertical upside point is set at an angle of 0 degree and the clockwise direction from the point is set to the positive direction, it is being supposed to position one opening 5a of the second oil hole 5 opening the outer face of the crank journal 2 at an angle of approx. +45 degrees in angle and position the other opening 5b opening on the outer face of the crank journal 2 and also communicating with the first oil hole 4 at an angle of +200 degrees (see FIG. 1).

In the shown arrangement, however, the opening 5a of the second oil hole 5 is positioned apart from a portion along a straight line C connecting a center A of the crank pin with a center B of the crank journal 2 and also included in a area having an oil clearance C2 broader than the oil clearance C1 between the outer face of the crank journal 2 and the inner face of the main metal 6 and along the line C. Therefore, the lubricating oil is apt to escape from an oil groove 6A on the main metal 6 laterally, so that the oil pressure applied on the second oil hole 5 is lowered.

Thus, it means that the pressure of lubricating oil passing from the second oil hole 5 to the side of the crank pin 3 via the first oil hole 4, that is, the oil pressure supplied to a connecting-rod metal disposed on a bearing part of a connecting rod supporting the crank pin 3 gets low.

Especially in the oblique oil hole structure, since the oil hole 4 is adapted so that the only one end on the crank pin's side opens to the inner face of the connecting-rod metal, the seizure is easy to occur to the connecting-rod metal originally requiring seriousness in lubricating.

Accordingly, as a matter of fact, it is difficult to apply the oblique oil hole structure involving the above-mentioned problem on a high-powered engine.

Under such a situation, with the improvement of positioning an oil hole formed in the crank journal, an object of the present invention is to provide a lubricating structure for an internal combustion engine, which is capable of increasing the oil pressure acting on the oil hole formed in the crank journal thereby to enhance the performance to supply the lubricating oil to the bearing part of the connecting rod while maintaining both wear-resistance and seizure-resistance influencing on the reliability of the journal bearing part, similarly to those in the conventional structure.

According to the invention, the above-mentioned object is accomplished by a lubricating structure for an internal combustion engine, comprising:

a crankshaft having a plurality of crank journals and a plurality of crank pins each disposed between the adjoining crank journals;

a plurality of oil holes formed in the crankshaft, for supplying lubricating oil to both of a journal bearing part provided in the internal combustion engine for bearing each of the crank journals and a connecting-rod bearing part provided in the internal combustion engine for bearing each of the crank pins; and wherein the oil holes formed in the crank journals are formed so that, in view of the axial direction of the crankshaft, at least one opening of each oil hole, which opens onto the outer peripheral face of each of the crank journals, substantially lies on a straight line for connecting respective centers of the adjoining crank pin and crank journal with each other.

The above and other features and advantages of this invention will become apparent, and the invention itself will best be understood, from a study of the following description and appended claims, with reference to the attached drawings showing one preferred embodiment of the invention.

DESCRIPTION OF THE PREFERRED EMBODIMENT

Referring to the attached drawings, we now describe embodiments of the present invention.

Figure 1:
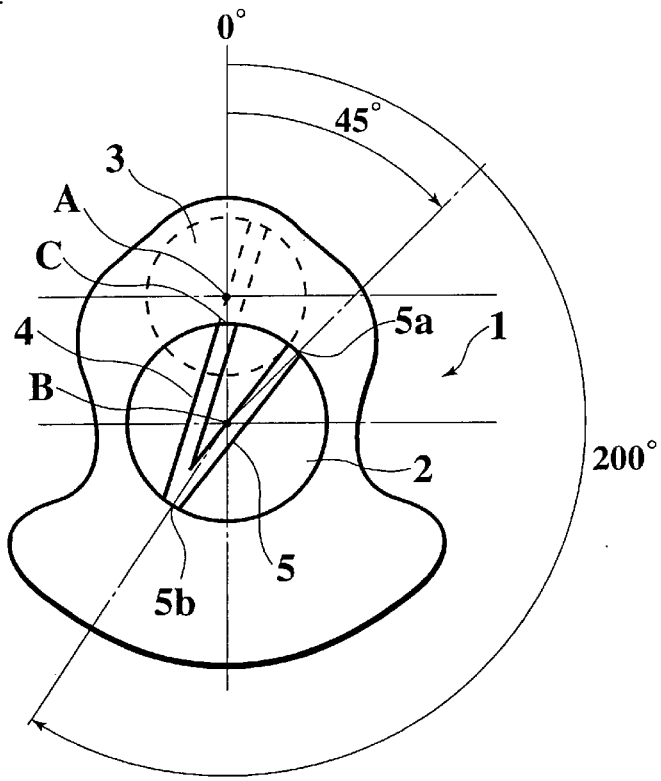
FIG. 1 is a schematic diagram viewed in the axial direction of a crankshaft provided with the related art lubricating structure.
Figure 2:
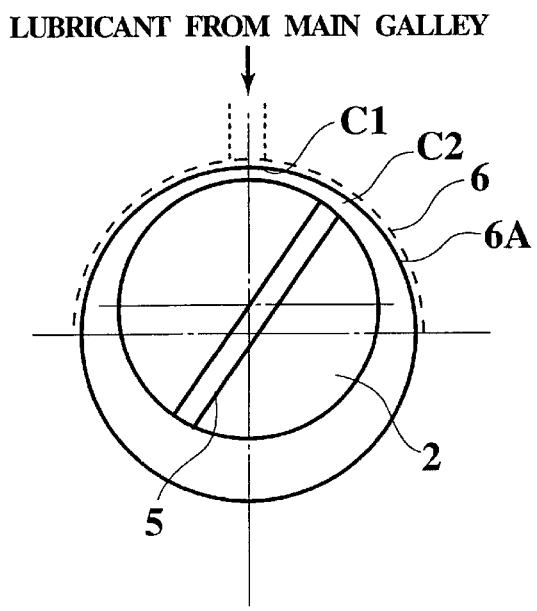
FIG. 2 is a schematic diagram for explanation of a problem of an oil hole formed in the crankshaft of FIG. 1, also viewed in the axial direction of the crankshaft.
Figure 3:
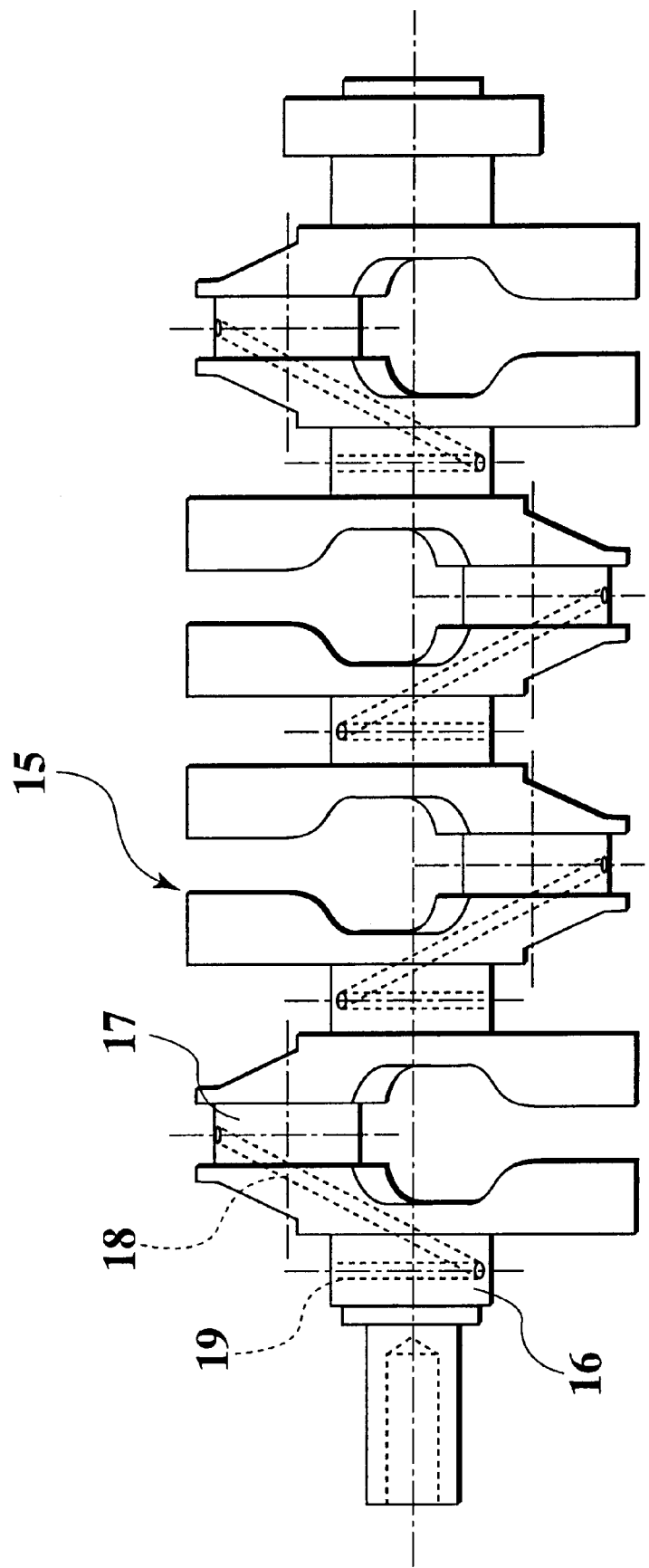
FIG. 3 is a front view of a crankshaft in a straight four-cylinder engine, including a lubricating structure in accordance with the first embodiment of the present invention.
Figure 4:
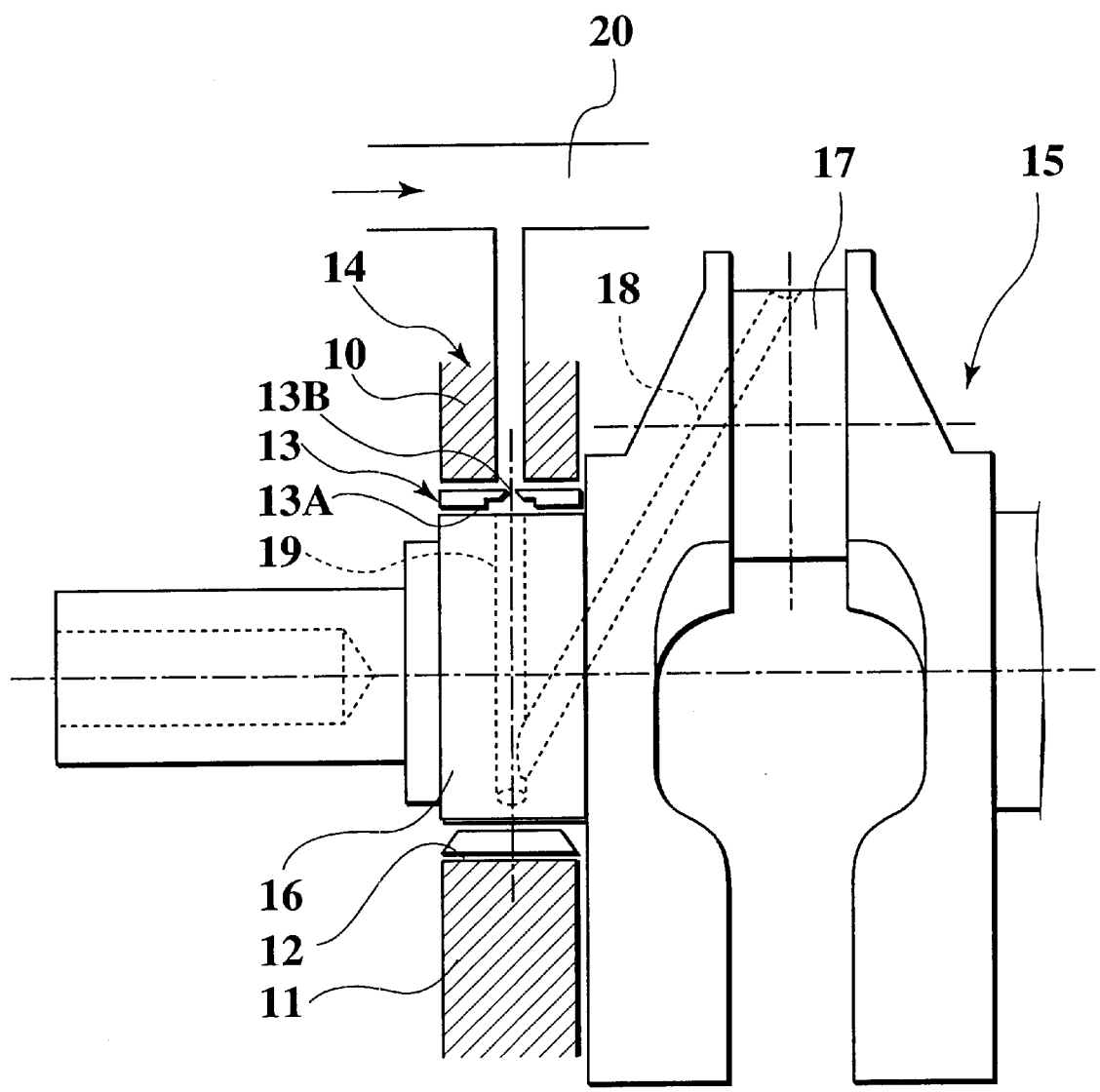
FIG. 4 is an enlarged view of an essential part of the crankshaft of FIG. 3, for explanation of the lubricating structure.

At first, we describe the structure of a crankshaft in accordance with the first embodiment, with reference to FIGS. 3 and 4. In these figures, the crankshaft 15 has a plurality of crank journals 16 rotatably fitted in journal bearing parts 14 (only one shown in FIG. 4). As shown in the figure, each journal bearing part 14 is constituted by a cylinder block 10, a bearing cap 11 fastened on the under face of the cylinder block 10 and a main metal 13 fitted in a circular bore 12 defined by the cylinder block 10 and the bearing cap 11. On the other hand, each crank pin 17 of the crankshaft 15 is rotatably fitted in a connecting-rod bearing part consisting of a base bottom of a not-shown connecting-rod and a connecting-rod metal fitted in a circular bore formed in the base bottom.

Hereat, the crankshaft 15 is provided with oil holes (or oil passages) for supplying lubricating oil to both journal bearing part 14 and connecting-rod bearing part.

In this embodiment, corresponding to the number of cylinders, the crankshaft 15 is provided with a plurality of first oil holes (i.e. lubricant passages) 18 and a plurality of second oil holes 19. Each first oil hole 18 is formed so as to extend from the outer peripheral face of the crank journal 16 to the outer peripheral face of the crank pin 17 while penetrating the crank journal 16 and the crank pin 17. On the other hand, each second oil hole 19 has one end communicating with a portion of the first oil hole 18 on the crank journal's side and the other end opening at the outer peripheral face of the crank journal 16.

The so-constructed oblique oil-hole structure has an advantage in both simplicity in structure of oil holes and easiness in forming the oil holes.

Figure 5:
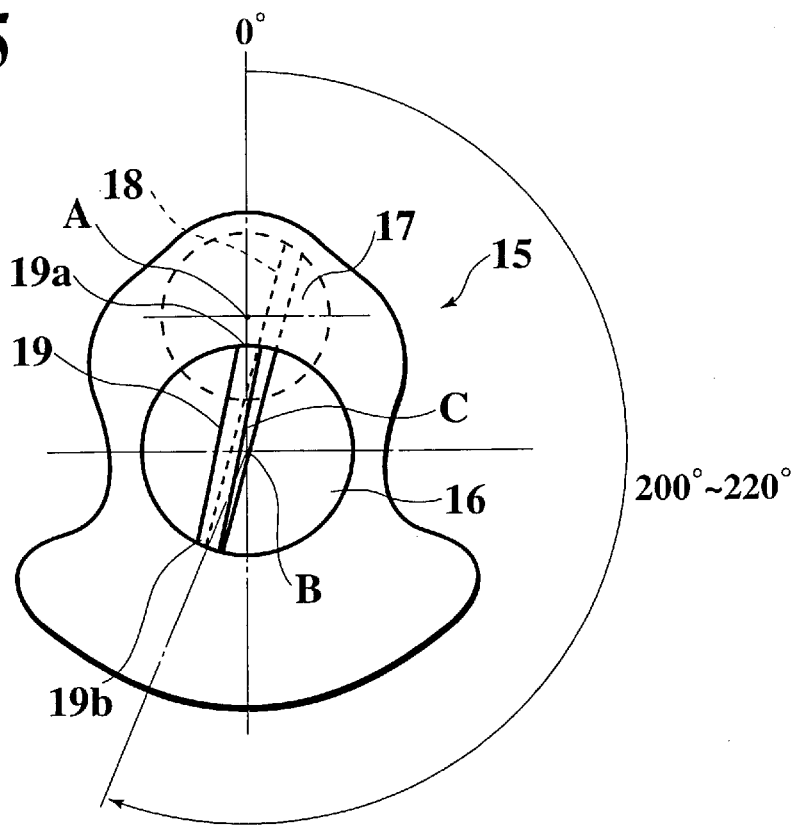
FIG. 5 is a schematic diagram viewed in the axial direction of the crankshaft of FIG. 3, showing the arrangement of respective oil holes formed therein.

Now, we describe the oblique oil-hole structure of the first embodiment by one crank journal 18 and one crank pin 17 in pairs. As shown in FIG. 5, according to the embodiment, an opening 19a of each second oil hole 19, which opens at the outer peripheral face of the crank journal 16, is disposed on a straight line C connecting a center A of the adjoining crank pin with a center B of the crank journal in the axial view of the crankshaft 15.

Thus, when it is established that, while positioning the crank pin 17 upward in the vertical direction, the vertical upside point is positioned at 0 degree and the clockwise direction from the point corresponds to the positive direction, the opening 19a of the second oil hole 19 in the crank journal 16, which opens at the outer peripheral face of the crank journal 16, is positioned at an angle of 0 degree.

While, the other opening 19b which not only opens at the outer peripheral face of the crank journal 16 but communicates with the first oil hole 18 is disposed at an angle of +200~+220 degrees.

Note, the opening 19a is not necessarily arranged so that a center thereof is on the straight line C connecting the center A of the adjoining crank pin 17 with the center B of the crank journal 16. Thus, the opening 19a may be arranged in the vicinity of the straight line C. For example, a part of the opening 19a may overlap with the line C.

Figure 6:
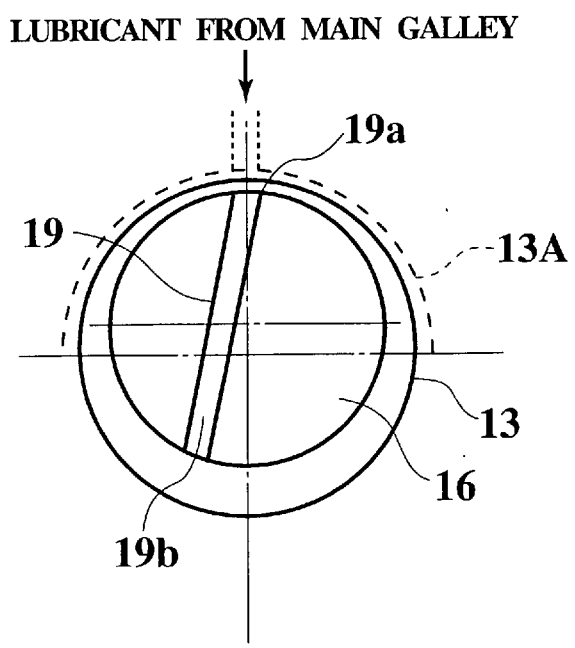
FIG. 6 is a diagram for explanation of the operation of an oil hole formed in one crank journal of the crankshaft of FIG. 3, also viewed in the axial direction of the crankshaft.

Referring to FIG. 6, we now describe the operation and effects due to the oil holes arranged in the crankshaft 15 in the above way.

In the axial view of the crankshaft 15, an oil clearance between the outer peripheral face of the crank journal 16 and the inner peripheral face of the main metal 13 is minimized on the straight line C linking the center A of the crank pin 17 with the center B of the crank journal 16 or minimized in the vicinity of the line C, in comparison with the oil clearances of the other portions.

Due to the weight balance of the crankshaft 15, great centrifugal force is usually applied on a part of the crankshaft 15 including the crank pin 17 during the crankshaft's rotation. Therefore, in the axial view of the crankshaft 15, the opening 19a of the second oil hole 19 existing on the straight line C is always positioned in an area having the smallest oil clearance, except an expansive process of the piston. Thus, due to the reduced oil clearance, it is hard for the lubricating oil to escape sideways through an oil groove 13A, which is formed in the inner face of an upper metal constituting the main metal 13 together with a lower metal, in the vicinity of the opening 19a. Consequently, the lubricating-oil pressure exerting on the second oil hole 19 is so raised as to elevate oil pressure for feeding the lubricating oil into the crank pin 17 through the oil hole 19 and the sequent oil hole 18, i.e., lubricating pressure for the connecting-rod bearing part.

The lubricating oil distributed from a main gallery 20 of FIG. 4 is supplied through an oil orifice 13B of the main metal 13 under high pressure (e.g. approx. 5 kgf/cm$^2$). Therefore, when the oil orifice 13B coincides with the openings 19a, 19b of the oil hole 19 in communication relationship, then the high lubricating pressure applies on the oil hole 19 directly, so that the lubricating oil of high pressure is supplied to the connecting-rod bearing part.

Hereat, it should be noted that, in the conventional oblique oil-hole structures similar to that of the embodiment, it is not easy by nature to lubricate the connecting-rod metal since the oil hole (passage) in the crank pin 17 opens to the inner face of the connecting-rod bearing part at only one end of the oil passage. However, according to the embodiment of the invention, it is possible to prevent the occurrence of seizure of the connecting-rod metal owing to the highly-maintained lubricant pressure for the connecting-rod bearing part.

Accordingly, it is possible to equip the high-powered engine with the crankshaft having the above-mentioned oblique oil-hole structure.

Note, since the lubricating structure of the present embodiment is similar to the conventional structure in terms of frequency that the openings 19a, 19b of the oil hole 19 in the crank journal 16 occupy the above-mentioned area of thin film thickness, the wear-resistance and seizure-resistance affecting the reliability of the main metal 13 can be maintained as usual.

Although the above-mentioned embodiment has been described with reference to the oblique oil-hole structure where the crankshaft 15 is provided with the first oil holes 18 each passing from the outer peripheral face of the crank journal 16 to the outer peripheral face of the crank pin 17 while penetrating the crank journal 16 and the crank pin 17 and the second oil holes 19 each having one end communicating with the part of the first oil hole 18 on the crank journal's side and the other end opening to the outer face of the crank journal 16, the present invention is also applicable to other oil-hole structures different from the above oblique oil-hole structure.

Figure 8:
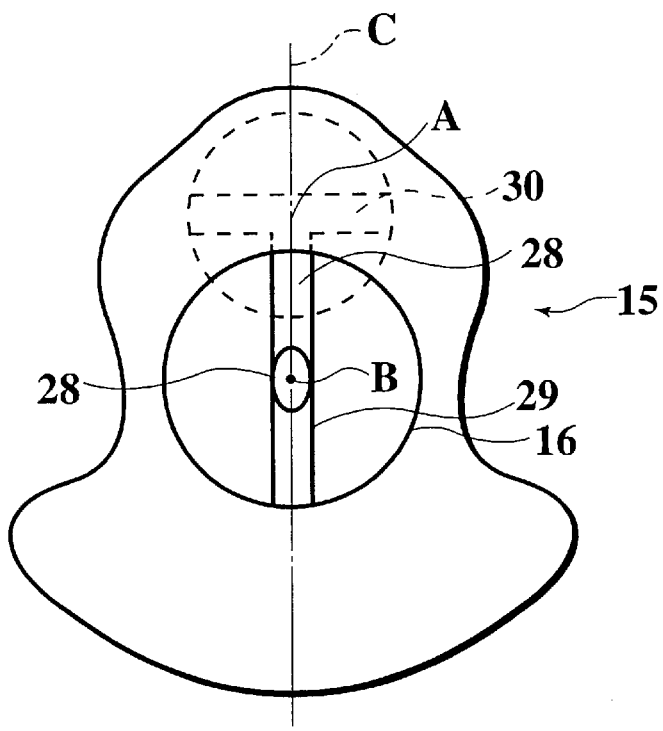
FIG. 8 is a schematic diagram viewed in the axial direction of the crankshaft of FIG. 7, showing the arrangement of respective oil holes formed therein.
Figure 9:
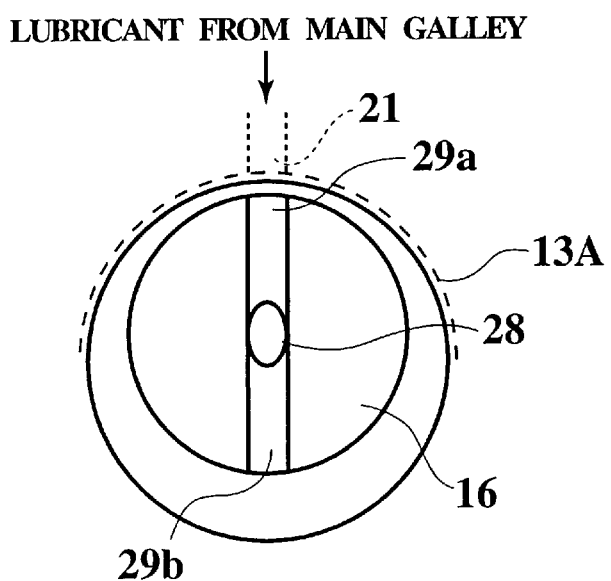
FIG. 9 is a diagram for explanation of the operation of an oil hole formed in one crank journal of the crankshaft of FIG. 7, also viewed in the axial direction of the crankshaft.

FIG. 8 and FIG. 9 show a substantial H-shaped oil-hole structure in accordance with another embodiment of the invention. Note, in this embodiment, elements similar to those of the previous embodiment are respectively indicated with the same reference numerals and the overlapping descriptions of the elements are deleted.

Figure 7:
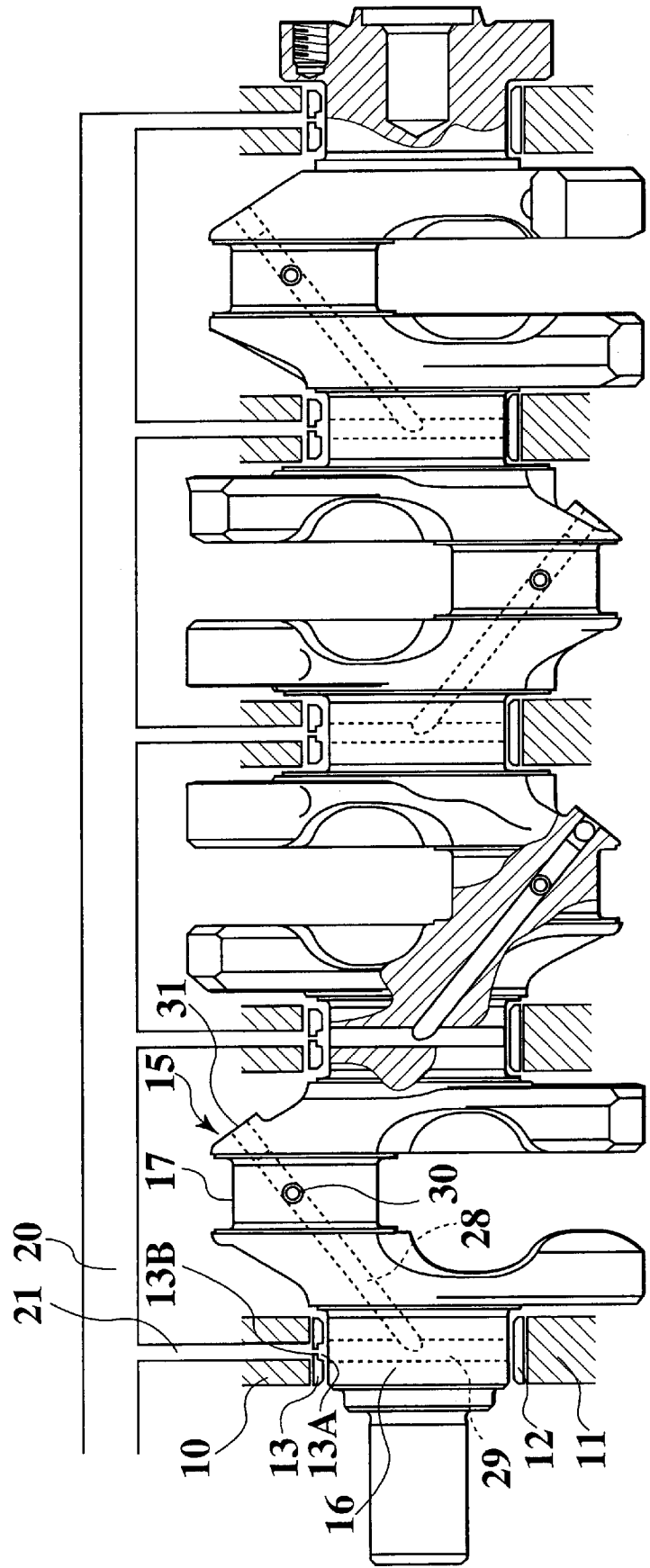
FIG. 7 is a front view of another crankshaft in the straight four-cylinder engine, including the lubricating structure in accordance with the second embodiment of the present invention.

Different from the first embodiment, the crankshaft 15 is provided with a plurality of oil holes 28, 29, 30. Each oil hole 29 is formed so as to penetrate the crank journal 16 from one peripheral side to the opposite side. As obvious from FIGS. 7 and 8, each oil hole 29 is positioned perpendicularly to the crankshaft's axis passing through the respective centers of the crank journals 16.

On the other hand, each oil hole 30 is also formed so as to penetrate the crank pin 17 from one peripheral side to the opposite side, perpendicularly to a line passing through the respective centers of the crank pins 16. Regarding one crank journal 16 and one crank pin 17 in pairs, the oil hole 29 in the former and the oil hole 30 in the latter are arranged in parallel with each other.

In order to communicate the oil hole 29 with the oil hole 30, the oil hole 28 is obliquely pierced in the crankshaft 15 so as to extend from the vicinity of the crank pin 17 toward the crank journal 16. In detail, the oil hole 28 is positioned so as to intersect with the oil hole 30 at its substantial intermediate part and also open into the oil hole 29 at its substantial intermediate part. thereof the oil hole 30. Note, the opening other end of the communication oil hole 28 is closed up with a plug 31 securely. In this way, according to the embodiment, a substantial H-shaped oil-hole structure is completed.

As shown in FIG. 9, also in this embodiment, both openings 29a, 29b of the oil hole 29 opening at the outer peripheral face of the crank journal 16 are positioned in alignment with an oil passage 21 extending from the main gallery 20 in the axial view of the crankshaft 15.

Thus, when it is established that, while positioning the crank pin 17 upward in the vertical direction, the vertical upside point is positioned at an angle of 0 degree and the clockwise direction from the point corresponds to the positive direction, the opening 29a is positioned at an angle of 0 degree while the other opening 29b is positioned at an angle of 180 degrees.

The H-shaped oil-hole structure of the embodiment operates as follows.

Also in this embodiment, when the crankshaft 15 rotates, the great centrifugal force is usually applied on a part of the crankshaft 15 including the crank pin 17 due to the weight balance of the crankshaft 15. Therefore, in the axial view of the crankshaft 15, the opening 29a of the oil hole 29 always occupies the area having the smallest oil clearance, except an expansive process of the piston. Thus, due to the reduced oil clearance, it is hard for the lubricating oil to escape sideways through the oil groove 13A. Consequently, the lubricating-oil pressure exerting on the oil hole 29 is so raised as to elevate the oil pressure for feeding the lubricating oil into the crank pin 17 through the oil hole 28 and the sequent oil hole 30.

According to the embodiment, since the H-shaped oil-hole structure is constituted by simple through-holes (29, 30) and a semi through-hole (28) for mutual connection with the holes, it is easy to form the structure in the crankshaft. Additionally, as the oil hole 30 in the crank pin 17 opens into the inner face of the connecting-rod bearing part at both ends of the oil passage, it is possible to prevent the occurrence of seizure of the connecting-rod metal furthermore.

The entire contents of Japanese Patent Application No. 10-250987 (filed Sep. 4, 1998) is incorporated herein by reference.

Although the invention has been described above by reference to two embodiments of the invention, the invention is not limited to these embodiments described above. Modifications and variations of the embodiment described above will occur to those skilled in the art, in light of the above teachings.

The scope of the invention is defined with reference to the following claims.

What is claimed is:

1. A lubricating structure for an internal combustion engine, comprising:

a crankshaft having a plurality of crank journals and a plurality of crank pins each disposed between the adjoining crank journals;

a plurality of oil holes formed in the crankshaft, for supplying lubricating oil to both of a journal bearing part provided in the internal combustion engine for bearing each of the crank journals and a connecting-rod bearing part provided in the internal combustion engine for bearing each of the crank pins;

wherein the oil holes formed in the crank journals include a cross oil hole which extend entirely through the crank journals and has openings at both ends thereof, in view of the axial direction of the crankshaft, at least one opening of the cross oil hole, which opens onto the outer peripheral face of each of the crank journals, substantially lies on a straight line for connecting respective centers of the adjoining crank pin and crank journal with each other.

2. A lubricating structure for an internal combustion engine, comprising:
- a crankshaft having a plurality of crank journals and a plurality of crank pins each disposed between the adjoining crank journals;
- a plurality of oil holes formed in the crankshaft, for supplying lubricating oil to both of a journal bearing part provided in the internal combustion engine for bearing each of the crank journals and a connecting-rod bearing part provided in the internal combustion engine for bearing each of the crank pins;
- wherein the oil holes formed in the crank journals are formed so that, in view of the axial direction of the crankshaft, at least one opening of each oil hole, which opens onto the outer peripheral face of each of the crank journals, substantially lies on a straight line for connecting respective centers of the adjoining crank pin and crank journal with each other;
- wherein, in view of the axial direction of the crankshaft, each of the openings of the oil holes, which opens onto the outer peripheral face of each of the crank journals, at least overlaps with the straight line partially.

3. A lubricating structure for an internal combustion engine, comprising:
- a crankshaft having a plurality of crank journals and a plurality of crank pins each disposed between the adjoining crank journals;
- a plurality of oil holes formed in the crankshaft, for supplying lubricating oil to both of a journal bearing part provided in the internal combustion engine for bearing each of the crank journals and a connecting-rod bearing part provided in the internal combustion engine for bearing each of the crank pins;
- wherein the oil holes formed in the crank journals are formed so that, in view of the axial direction of the crankshaft, at least one opening of each oil hole, which opens onto the outer peripheral face of each of the crank journals, substantially lies on a straight line for connecting respective centers of the adjoining crank pin and crank journal with each other;
- wherein the oil holes formed in the crankshaft comprise a plurality of first oil holes each extending from the outer peripheral face of the crank journal to the outer peripheral face of the crank pin while penetrating the crank journal and the crank pin and a plurality of second oil holes each having one end communicating with a part of the first oil hole existing in the crank journal and the other end opening onto the outer peripheral face of the crank journal and wherein, in view of the axial direction of the crankshaft, the other end of each second oil hole substantially lies on a straight line for connecting respective centers of the adjoining crank pin and crank journal with each other.

4. The lubricating structure of claim 3, wherein, in view of the axial direction of the crankshaft, each of the openings of the oil holes, which opens onto the outer peripheral face of each of the crank journals, at least overlaps with the straight line partially.

5. A lubricating structure for an internal combustion engine, comprising:
- a crankshaft having a plurality of crank journals and a plurality of crank pins each disposed between the adjoining crank journals;
- a plurality of oil holes formed in the crankshaft, for supplying lubricating oil to both of a journal bearing part provided in the internal combustion engine for bearing each of the crank journals and a connecting-rod bearing part provided in the internal combustion engine for bearing each of the crank pins;
- wherein the oil holes formed in the crank journals are formed so that, in view of the axial direction of the crankshaft, at least one opening of each oil hole, which opens onto the outer peripheral face of each of the crank journals, substantially lies on a straight line for connecting respective centers of the adjoining crank pin and crank journal with each other;
- wherein the oil holes formed in the crankshaft comprise a plurality of first oil holes each extending from the crank journal to the crank pin, a plurality of second oil holes each penetrating the crank journal perpendicularly to the axial direction of the crankshaft while passing the center of the crank journal and a plurality of third oil holes each penetrating the crank pin perpendicularly to the axial direction of the crankshaft;
- each of the first oil holes is formed so as to communicate with both of the second oil hole and the third oil hole at respective intermediate portions thereof; and wherein, in view of the axial direction of the crankshaft,
- at least one opening of each second oil hole substantially lies on a straight line for connecting respective centers of the adjoining crank pin and crank journal with each other.

6. The lubricating structure of claim 5, wherein, in view of the axial direction of the crankshaft, the one opening of each second oil hole at least overlaps with the straight line partially.

* * * * *